US011588795B2

(12) United States Patent
Sorensen et al.

(10) Patent No.: US 11,588,795 B2
(45) Date of Patent: Feb. 21, 2023

(54) METHOD AND SYSTEM FOR DATA TASKING AND RECEIPT

(71) Applicant: R2 Space, LLC, Ann Arbor, MI (US)

(72) Inventors: Reuben Sorensen, Ann Arbor, MI (US); Ryan Farris, Arlington, VA (US); Doug Muhlbauer, Sterling, VA (US)

(73) Assignee: R2 SPACE, LLC, Ann Arbor, MI (US)

( * ) Notice: Subject to any disclaimer, the term of this patent is extended or adjusted under 35 U.S.C. 154(b) by 211 days.

(21) Appl. No.: 16/835,141

(22) Filed: Mar. 30, 2020

(65) Prior Publication Data

US 2020/0314071 A1 Oct. 1, 2020

Related U.S. Application Data

(60) Provisional application No. 62/825,718, filed on Mar. 28, 2019.

(51) Int. Cl.
*H04L 9/40* (2022.01)
*G06F 9/54* (2006.01)
*G06F 9/48* (2006.01)
*H04L 9/14* (2006.01)

(52) U.S. Cl.
CPC ........ *H04L 63/0428* (2013.01); *G06F 9/4843* (2013.01); *G06F 9/54* (2013.01); *H04L 9/14* (2013.01); *H04L 63/0272* (2013.01)

(58) Field of Classification Search
None
See application file for complete search history.

(56) References Cited

U.S. PATENT DOCUMENTS

2018/0205715 A1* 7/2018 Ingale ................... H04L 63/062

* cited by examiner

*Primary Examiner* — Brandon Hoffman

(57) ABSTRACT

A tasking network system comprising a client system configured to send a tasking order and providing instructions for operating a remote device anonymously. An operations center including configured to receive an incoming tasking order and processor handling the incoming tasking order without receiving the client ID from the client. A security tag is associated with the tasking order which may be correlated in a remote server.

20 Claims, 2 Drawing Sheets

METHOD AND SYSTEM FOR DATA TASKING AND RECEIPT

CROSS-REFERENCE TO RELATED APPLICATION

This application claims priority to and the benefit of U.S. Provisional Patent Application No. 62/825,718 filed Mar. 28, 2019. The foregoing provisional application is incorporated by reference herein in its entirety.

GENERAL DESCRIPTION

The present disclosure generally relates to a method and system for data tasking and receipt. Productivity gains related with the adoption of computing, tend to increase as various interrelated systems are more closely integrated. Computing tasks on devices large and small increasingly leverage cloud based solutions for scalability. As a result of this trend, sensitive data may pass through unsecured network segments, such as the internet, and data security becomes an issue of paramount importance in allowing devices to further leverage the efficiencies possible through cloud based, virtualized hosting solutions. Commercial tasking solutions today use unsecure networks vulnerable to cyber-attack. Thus, there are challenges regarding how to transport and send sensitive tasking data. There is a demand for a secure and anonymous method for transferring data.

BRIEF DESCRIPTION OF THE DRAWINGS

The features, aspects, and advantages of the present disclosure will become apparent from the following description, and the accompanying exemplary embodiments shown in the drawings, which are briefly described below.

DETAILED DESCRIPTION

Figure 1:
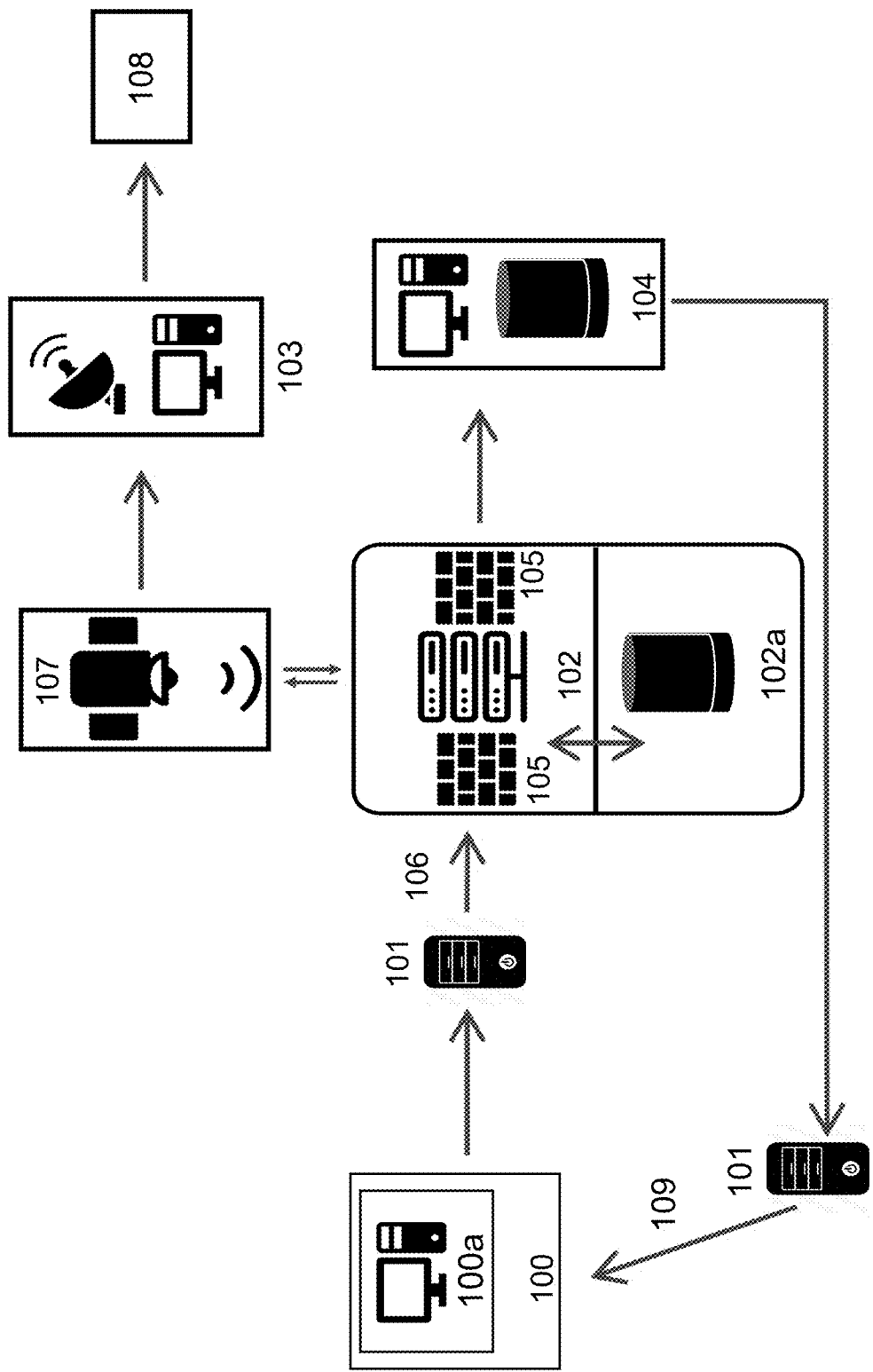
FIG. 1 is a schematic of a tasking and receipt system according to a first embodiment.

Exemplary methods and systems to provide a secure way to transfer data are disclosed. In the following description, for purposes of explanation, numerous specific details are set forth in order to provide a thorough understanding of example embodiments. It will be evident, however, to one skilled in the art that the present invention may be practiced using alternatives/

One disclosed embodiment is directed to a system for receiving a tasking order from a client and providing instructions for operating a remote device. The system includes an operations center having a receiver configured to receive an incoming tasking order and a processor for handling the incoming tasking order, wherein the tasking order may include a data packet. The data packet may be assigned a security tag by the processor, wherein the security tag correlates to a client ID that is associated with the client, and wherein the client ID is stored in a remote server that is inaccessible to the client or other entities outside the system. The processor is configured to generate instructions for the remote device from the receiving data packet, wherein the instructions include the security tag and are transmitted to the remote device from the operations center. The operations center may include an application programming interface (API) configured to accept the client's tasking instructions in a format compatible with the processor. The server includes a database and may be configured to review both the tasking order and to review a plurality of client IDs stored in the database in order to correlate the client with the specific client ID. The security tag may be configured to include randomly generated characters. The security tag is assigned to the specific client ID and stored in the database. The operations center include a transmitter for transmitting the instructions to the remote device. The tasking order may be transmitted by the client to the operations center using a virtual private network (VPN) and may be encrypted using a $2^{256}$ encryption key (256 bit).

As disclosed herein, an obfuscation system and method may be executed through a secure remote browser/VPN, and an API for data tasking and receipt. As described herein a client system may interface through the remote web browser/VPN to connect to a receiving unit via an API. The receiving unit such as an operations center assigns a randomly generated security tag (e.g., a 15 digit hexadecimal string of characters) to the tasking order sent from the client system. The receiving unit may communicate with a storage device located in a remote unit that may include a separate processor (e.g., a cloud server) and a ground module for tasking and receipt of the data. The client's secure anonymous non-attributable and obfuscated tasking and/or receive request(s) are executed through secure remote browser/VPN.

In an exemplary embodiment, all data received by the receiving unit (e.g., operations center) is stored, secured, and encrypted in the storage device. The connection between the receiving unit and the storage device is routed through a receiving unit VPN for further receipt via the API service of the client's secure remote browser/VPN. The task receipt may also be sent to the client from the storage device via the API of the secure remote browser/VPN connected to the client.

FIG. 1 provides an exemplary overview of the above-described tasking and receipt system. One exemplary use of this system may be in the field of satellite imaging for facilitating the tasking and receipt of data to and from a satellite. A client system 100 may interface through the remote web browser and/or VPN 101 for a secure and anonymous connection to an operations center (OC) 102 for a satellite system. The operations center 102 may be configured to provide a client with access to a remote device (e.g., satellite 107) using a client's authenticated credentials (e.g. registered user ID).

The secure remote bowser and/or VPN 101 communicates with the operation center 102 via an API 106. The secure remote browser (e.g., a cloud browser) and application programming interface (API) allows the client system 100 to provide for tasking and receipt of data that is secure via obfuscation across the breadth of operations and provides the ability to access, task, and retrieve data from for example, a web interface of a client portal 100a. The API utilized in an exemplary embodiment will consider and interface with all features, routines, protocols, dependencies, and tools while maintaining secured authentication. The API is provided to simplify integration and development, facilitate a mixture of technology over time, support evolving operational concepts, to avoid restrictions and allow for the mix of various old and new technologies and off-the-shelf products. The API supports a "plug and play" capability that allows the system to evolve and be upgraded over time. The configuration of the system prevents obsolesce and avoids the significant cost of trying to maintain outdated equipment or software.

The API 106 (or 109) provides access between nodes (e.g. a client and the operations center, a storage device and the client, etc.). The operations center may include any command center (e.g., processing center, headquarters, command module, control module, etc.) configured to handle protected data (e.g., financial data, medical records, trade secrets, transaction data, personal information, etc.). Specifically in one embodiment, the operations center facilitates the dynamic distribution of space assets (e.g., satellites 107) and provides tasking of the assets based on clients' authenticated credentials (e.g., user ID and security tag). The operations center 102 will automate the prioritization and allocation process of dynamically taskable satellites 107 and allow clients to dynamically apportion and prioritize collected assets (e.g., captured data). The software-based, obfuscation and encryption solution disclosed herein ensures customer imagery request is kept separate from their identity, ensuring tasking details—such as target coordinates, collection parameters, frequency of collection—are masked and separated from customer identity. This system allows verifying identity and access management while maintaining anonymity and elimination the possibility that an adversary could use logs or other records to reconstruct customer activity.

Tasking data from client 100 to the operations center 102 may be encrypted using, for example, the client's $2^{256}$ public encryption key (256 bit) rendering the tasking data (e.g., a data packet) indecipherable. Clients may access the remote device (e.g., a satellite) from the client 100 (e.g. via anonymous client ID) to the secure cloud hosted tasking portal 100a for request of images or other data provided by a remote device. The tasking portal 100a may include an application and client interface through which a client may interact in order to task or receive data. The system uses a randomly assigned client ID file attribution (e.g., security tag), which may be used for billing and customer service, maintained at different authorization levels (e.g. secret or top secret levels and off-network). The security tag is only attributable to a specific client in those authorized levels. The tasking request sent by the client 200 may be represented by a tasking request (e.g., a data packet). The security tag is associated and linked with the tasking request data sent by the client 100.

The operations center 102 may generate the random security tag via a processor. The random security tag may be a 15 digit hexadecimal string of characters. Different tasking requests from the same client may include different security tags for the corresponding request. The operations center 102 communicates with a remote server 102a in order to attribute the security tag to a specific client. Different security tags may be attributed to the same client for different requests (i.e., different taskings or data packets) of the same client. The remote server 102a stores the registered client ID (i.e. clients) in a database.

The remote server 102a is further configured to review the tasking request order and review a plurality of client IDs (i.e. clients) stored in the database in order to correlate the client with the specific client ID (i.e. clients). This remote server 102 is inaccessible to entities outside the operations center 102. The operations center 102 may also include a receiver (not shown) configured to receive the data sent from the client system 100. The client ID will be tied to an entity with corresponding authorization to access the corresponding data. To manage the client ID and grant access to the data the client ID, data will primarily go through the secure remote browser 101, which includes provides an anonymous, IP-masked, and encrypted service (all data from client system 100 to end-point, or vice-versa, is encrypted using a public encryption key, for example AES 256, rendering it indecipherable without a corresponding private key of the receiving node). The exemplary client portal 100a and remote browser/VPN 101 provides various authentication options for the client ID or client. Typically, an assigned PIN is used to login to the client ID.

Other authentication options are available such as, a deferred PIN login, wherein clients can access limited functionality of the remote browser and network without entering a PIN. Further functionality would require using a PIN. Another authentication option is the use of a two-factor authentication (2FA), wherein the clients will be required to enter a one-tie code sent to their phone during login. Other authentication processes such as SAML-based SSO Authentication, and other single-factor or multi-factor may be used.

A resolving function may be utilized by the remote server 102a in order to attribute the randomized characters of the security tag to a specific client providing the tasking and receipt. The resolving function is only known at specific authorization levels. In certain embodiments, the attribution of the security tag to the associated client may only utilized via the resolving function.

As described above, in order to provide for secure transmissions, the client's secure, anonymous (i.e. anonymous to entities external to the operation center), non-attributable and obfuscated tasking/receive request may be executed through secure remote browser and/or VPN 101 to the operations center 102. The operations center 102 may communicate to the satellites 107 or other remote devices via a transmitter and a ground module 103 for tasking and receipt orders. The satellite may send captured data back to the operations center 102. The operations center 102 may also be configured to process captured data from satellites 107 in order to provide readable data to the specific tasking client or other end clients. The captured data and/or readable data may be sent to and stored in a remote cloud server 104 configured to communicate to the client 100 via the tasking/receipt portal 100a.

The remote cloud server 104 may communicate with the portal 100a using a secure API 109 and a secure remote browser/VPN 101 connected to the client tasking/receipt portal 100a. All communications between nodes may be encrypted (e.g., AES 256). All captured data and/or readable data are secured, and encrypted in the remote cloud server 104 for further receipt to the client 100 via the API service 109 via the client's secure remote browser/VPN 101.

The satellite 107 receives and executes the task sent by the client from the client 100. The ground module 103 is a device configured to process captured data (e.g. imaging data or some other form of sensed data captured by the satellite) to readable data to be received via a receiver at a remote receiver such as a tactical operation center 108. Captured data may be required to transformed to readable form. For example, captured data may include multiple images which may be stitched together using the ground module 103 via a processor, which transforms it into readable data. Other examples include wherein captured data may require a format change or format translation in order for the captured data to be usable. The operations center 102 may also be configured to transform the captured data from the satellite 107 to readable data via the processor. The tactical operations center 108 may be remote from the client system 100. The satellites 107 may employ any of a number of suitable for gathering images or data such as, radar, electro-optical, passive RF, Infrared.

The operations center 102 may automate the prioritization and allocation process of dynamically taskable satellites 107. The operations center 102 allow clients to dynamically apportion and prioritize collected assets (e.g. imaging data or some other form of sensed data captured by the satellite). The operation center may provide services through the API 106 such as multi-mission planning, interfacing with tactical clients and space controllers, interfacing with data clients to request assets, establishing standing distribution requests. The operations center 102 may provide standard telemetry displays (virtual strip charts, gas gauges, etc.) and annunciation along with sensor availability and resource limitations (satellite power, etc.). The operations center may autonomously determine (via machine-to-machine APIs) which satellite can collect (coverage analysis) with the task given by the client. The tasking data may include instructions for the satellite 107 in order to capture the required data (i.e. captured data). All data sent from and received by the operations center 102 are passed through VPN 105

Figure 2:
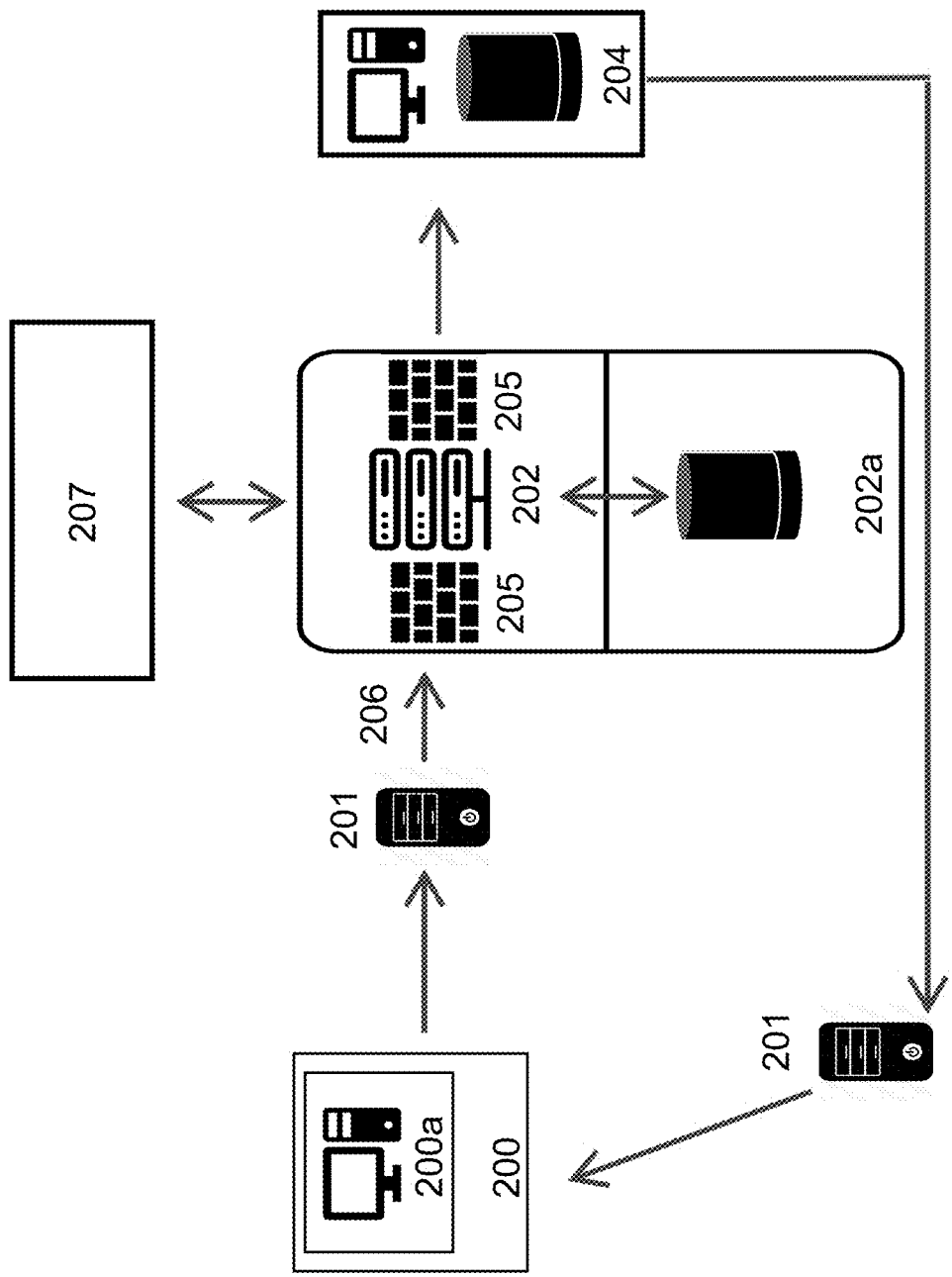
FIG. 2 is a schematic of a tasking and receipt system according to a second embodiment.

In FIG. 2, a system for providing tasking of a remote device is shown. The system provides for utilizing an anonymous tasking request. The embodiment shown in FIG. 2 functions similarly to the embodiment shown in FIG. 1. A client system or client 200 includes a client portal 200a configured to communicate to an operations center 202. The operations center includes a remote server 202a. Similar to the tasking request and receipt described in the first embodiment shown in FIG. 1, the client system 200 communicates with the operations center 202 through a remote browser 201 and API 206. A client may send a tasking request to the operations center 202 via the client portal 200a. The tasking request is represented by tasking request data which may comprise a data packet.

A security tag generated by a processor the operations center 202 is linked and associated with the tasking request data or data packet. The security tag may be attributed to the client or client system 200 via a remote server 202a having a resolving function configured to attribute the randomized characters of the security tag to a specific client providing the tasking and receipt. The tasking data may then be sent to a programmable machine 207 having a command module configured to receive the tasking data. The tasking data will be processed by the command module via a processor and various machine functions will be executed by the machine 207. The machine 207 may, for example, record various measurement through sensor(s) or perform actions such as movement required by the tasking data. The remote device or machine 207 may be any device needed to be controlled in an anonymous and secure fashion such as, for example, a drone, autonomous vehicle, camera, video monitor, infrastructure devices such as traffic or power grid components, or any devices controlled remotely from a command or control center. Any resulting data or captured data from the remote device or machine 207 may be sent back to the operations center 202 and stored in a cloud server 104. All data sent from and received by the operations center 202 are passed through VPN 205.

The captured data may be sent to and stored in a remote cloud server 204 configured to communicate to the client 100 via the tasking/receipt portal 200a. Communication methods of the remote cloud server 204 to the portal 200a may also include a secure API 209 and a secure remote browser/VPN 201 connected to the client tasking/receipt portal 200a. All communications between nodes are encrypted (e.g., AES 256). All captured data are secured and encrypted in the remote cloud server 204 for further receipt to the client 200 via the API service 209 through the client's secure remote browser/VPN 201.

Certain embodiments are described herein as including modules. Modules (e.g., ground module or command module) may constitute either software modules (e.g., code embodied on a machine-readable medium or in a transmission signal) or hardware modules. A hardware module may be a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation, and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example systems described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the system and methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

As used herein, the terms "a" or "an" shall mean one or more than one. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Reference throughout this document to "one embodiment," "certain embodiments," "an embodiment," or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics may be combined in any suitable manner on one or more embodiments without limitation.

Thus, a method and system to provide data tasking and receipt has been described. Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A system for receiving tasking orders from a client and providing instructions for operating satellites comprising:
    an operations center including a receiver configured to receive an incoming tasking order, a remote server, and a processor for handling the incoming tasking order, wherein the tasking order includes a data packet;
    wherein the processor assigns a security tag to the data packet, the security tag comprising characters, wherein the security tag correlates to a client ID that is associated with the client, and wherein the client ID is stored in the remote server, the remote server being inaccessible to the client;
    wherein the remote server utilizes a resolving function to attribute the characters of the security tag to the client; and
    wherein the processor is configured to generate instructions for a satellite from the received data packet, wherein the instructions include the security tag and are transmitted to the satellite from the operations center.

2. The system of claim 1, wherein the operations center includes an application programming interface (API) configured to receive the data packet in a format recognizable by the processor.

3. The system of claim 2, wherein the server includes a database, and wherein the server is configured to review the tasking order and to review a plurality of client IDs stored in the database in order to correlate the client with the specific client ID.

4. The system of claim 3, wherein the characters of the security tag comprise randomly generated characters.

5. The system of claim 4, wherein the security tag is assigned to the specific client ID and stored in the database.

6. The system of claim 1, wherein the operations center includes a transmitter for transmitting the instructions to the satellite.

7. The system of claim 6, wherein the tasking order is transmitted by the client to the operations center using a virtual private network (VPN).

8. The system of claim 7, wherein the tasking order is encrypted.

9. The system of claim 8, wherein the tasking order is encrypted using a $2^{256}$ encryption key.

10. An anonymous satellite tasking network system comprising:
    a client system configured to send a tasking order and providing instructions for operating a satellite;
    an operations center including a receiver configured to receive an incoming tasking order a remote server, and a processor for handling the incoming tasking order, wherein the tasking order includes a data packet;
    wherein the processor assigns a security tag to the data packet, the security tag comprising characters, wherein the security tag correlates to a client ID that is associated with the client, and wherein the client ID is stored in the remote server, the remote server being inaccessible to the client;
    wherein the remote server utilizes a resolving function to attribute the characters of the security tag to the client;
    wherein the processor is configured to generate instructions for the satellite, wherein the instructions are transmitted to the satellite from the operations center; and
    wherein the satellite is configured to produce captured data, wherein the operations center is configured to receive the captured data.

11. The system of claim 10, wherein the operations center includes an application programming interface (API) configured so that the client to provide instructions in a format compatible with the first software.

12. The system of claim 11, wherein the server includes a database, and wherein the server is configured to review the tasking order and to review a plurality of client IDs stored in the database in order to correlate the client with the specific client ID.

13. The system of claim 12, wherein the characters of the security tag comprise randomly generated characters.

14. The system of claim 13, wherein the security tag is assigned to the specific client ID and stored in the database.

15. The system of claim 10, wherein the operations center includes a transmitter for transmitting the instructions to the satellite.

16. The system of claim 15, wherein the tasking order is transmitted by the client to the operations center using a virtual private network (VPN).

17. The system of claim 16, wherein the tasking order is encrypted.

18. The system of claim 17, wherein the tasking order is encrypted using a $2^{256}$ encryption key.

19. The system of claim 10, wherein the captured data and the security tag is sent to a module having a module processor configured to receive the captured data and transform the captured data to a readable data, wherein the readable data is sent from the module to a remote location.

20. The system of claim 10, wherein the captured data is sent to the operations center from the satellite, wherein the captured data is transformed via the processor of the operations center to a readable data, wherein the readable data and the security tag is sent to an auxiliary storage device remote from the operations center.

* * * * *